United States Patent [19]

Kajitani et al.

[11] Patent Number: 4,986,404
[45] Date of Patent: Jan. 22, 1991

[54] HYDRAULIC CLUTCH RELEASING MEANS

[75] Inventors: Koji Kajitani; Minoru Abe, both of Neyagawa, Japan

[73] Assignee: Kabushiki Kaisha Daikin Seisakusho, Osaka, Japan

[21] Appl. No.: 441,578

[22] Filed: Nov. 27, 1989

[30] Foreign Application Priority Data

Dec. 15, 1988 [JP] Japan .................. 63-162964[U]

[51] Int. Cl.$^5$ .................. F15B 1/00; F16L 55/00
[52] U.S. Cl. .................. 192/109 F; 192/85 R; 60/591; 138/31
[58] Field of Search .......... 192/109 F, 85 R, 85 C, 192/91 R; 60/591; 138/31

[56] References Cited

U.S. PATENT DOCUMENTS

| 4,499,728 | 2/1985 | Therond | 60/591 |
| 4,860,868 | 8/1989 | Murakami | 192/109 F |
| 4,871,051 | 10/1989 | Whitmer | 192/85 C |

FOREIGN PATENT DOCUMENTS 0045225  3/1984  Japan .................. 192/109 F
877590   9/1961  United Kingdom ...... 192/85 C Primary Examiner—Rodney H. Bonck
Assistant Examiner—Andrea Pitts
Attorney, Agent, or Firm—Armstrong, Nikaido, Marmelstein, Kubovick & Murray

[57] ABSTRACT

A cylindrical cylinder chamber formed by a casing and having inlet and outlet ports for pressure liquid at its both axial ends is installed in a liquid passage communicating a liquid chamber of the master cylinder device with a liquid chamber of the slave cylinder device. A cylindrical friction member divided circumferentially into plural pieces contacting with a peripheral wall of the cylinder chamber, a moving body carrying the friction member, plural first urging members fitted to the moving body for pressing the friction member onto the peripheral wall of the cylinder chamber, and a second urging member for urging the moving body in its axial direction in order to locate the moving body at a prescribed axial position of the cylinder chamber, are installed in the cylinder chamber. An orifice is formed on the moving body or the friction member in the axial direction.

8 Claims, 4 Drawing Sheets

HYDRAULIC CLUTCH RELEASING MEANS

BACKGROUND OF THE INVENTION

1. Industrial Useful Field

This invention relates to a hydraulic clutch releasing means equipped with a master cylinder device driven by operating a clutch pedal and a slave cylinder device driven by hydraulic pressure supplied from the master cylinder device for engaging or disengaging a clutch and, more particularly, to such a clutch releasing equipment having a vibration damping absorbing means thereon.

2. Prior Art

In a hydraulic clutch releasing means equipped with a master cylinder device driven by operating a clutch pedal and a slave cylinder device driven by hydraulic pressure supplied from the master cylinder device for engaging or disengaging a clutch, vibration of clutch causes a hydraulic pressure in hydraulic circuit to fluctuate and the vibration is transmitted to a clutch pedal when the clutch pedal is trodden, so that a driver feels uncomfortable. Further, even when the clutch pedal is not trodden, abnormal sound is generated by the transmission of vibration.

In order to solve this problem, a means as illustrated by FIG. 5 has conventionally been proposed. In this means, a cylinder chamber 51 is installed in a proper place of a liquid passage 50; a piston 52 sliding freely perpendicularly to a direction of liquid flow, a rubber elastic body 53, and a coil spring urging the piston 52 toward the rubber elastic body 53 are installed in the cylinder chamber 51; and hydraulic pressure fluctuation is received by the piston 52 and absorbed by expansion and contraction of the rubber elastic body 53.

Further, another means has been proposed, in which vibration has been absorbed by installing a rubber elastic body in a master cylinder device and by having a piston of the master cylinder device contact with the rubber elastic body.

In any of these conventional structures, however, a stroke loss has been produced because of contraction of the rubber elastic body 53 at the time when the clutch pedal has been trodden for disengaging the clutch.

SUMMARY OF THE INVENTION

Object of the Invention

An object of this invention is to provide a hydraulic clutch releasing means which can preferably damp vibrations propagated from a clutch through a hydraulic circuit to a clutch pedal without producing a stroke loss when the clutch pedal is trodden.

Structure of the Invention

In order to accomplish the above object, this invention provides a hydraulic clutch releasing means equipped with a master cylinder device driven by operating a clutch pedal and a slave cylinder device driven by hydraulic pressure supplied from the master cylinder device for engaging or disengaging a clutch, characterized by that a cylindrical cylinder chamber formed by a casing and having inlet and outlet ports for pressure liquid at its opposite axial ends is installed in a liquid passage communicating a liquid chamber of the master cylinder device with a liquid chamber of the slave cylinder device; a cylindrical friction member divided circumferentially into plural pieces contacting with a peripheral wall of the cylinder chamber, a moving body carrying the friction member, plural first urging members fitted to the moving body for pressing the friction member onto the peripheral wall of the cylinder chamber, and a second urging member for urging the moving body in its axial direction in order to locate the moving body at a prescribed axial position of the cylinder chamber is installed in the cylinder chamber; and an orifice is formed on the moving body or the friction member in the axial direction.

DETAILED DESCRIPTION OF THE INVENTION

Embodiment 1

Figure 1:
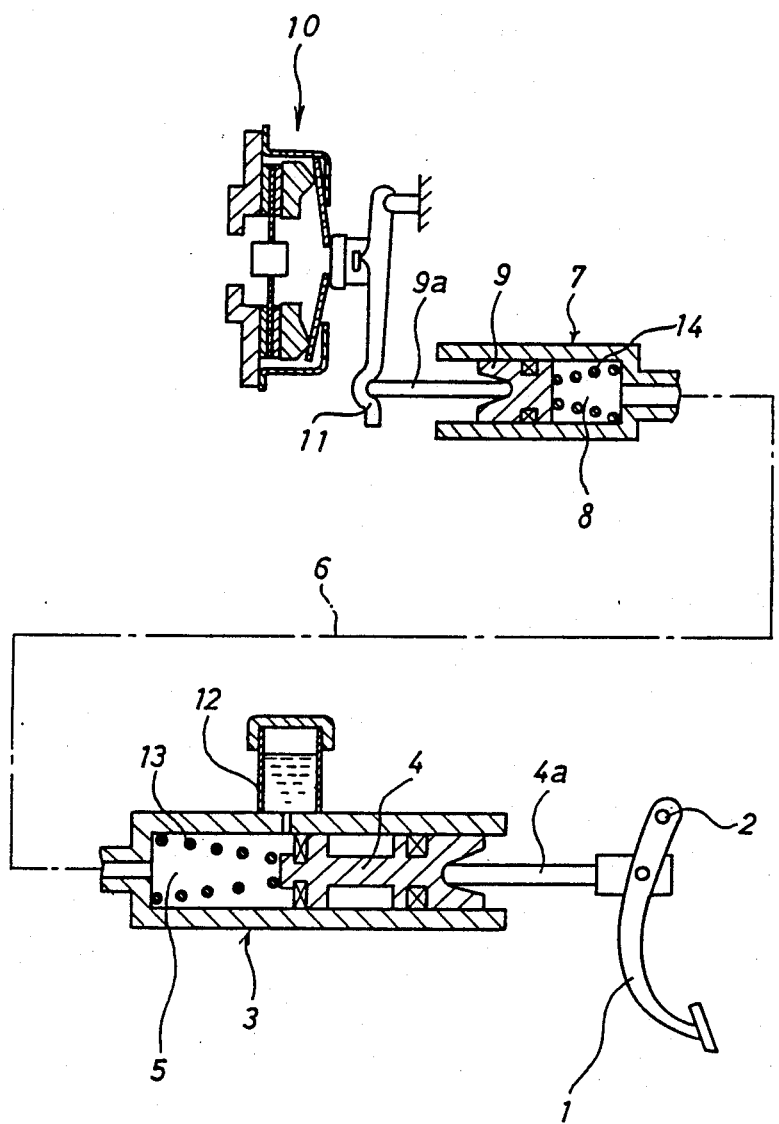
FIG. 1 is a schematic structural diagram of a hydraulic clutch releasing means in an embodiment of this invention.

In FIG. 1 which is the schematic structural diagram of the hydraulic clutch releasing means in the embodiment of this invention, a clutch pedal 1 swingable around a horizontally installed shaft 2 is connected through a piston rod 4a to a piston 4 of a master cylinder device 3. A liquid chamber 5 of the master cylinder device 3 communicates through a liquid passage 6 to a vibration damping cylinder 18 and a liquid passage 6' and to a liquid chamber 8 of a slave cylinder device 7. A piston 9 of the slave cylinder device 7 is connected through a piston rod 9a to a release rod 11 which engages and disengages a clutch 10. A liquid tank 12 communicating with the liquid chamber 5 is fitted to the master cylinder device 3. Liquid such as brake fluid is stored in the liquid tank 12 The liquid chambers 5 and 8 the liquid passages 6, 6' and cylinder 18 are filled with liquid. Coil springs 13 and 14 are installed in the liquid chambers 5 and 8.

Figure 2A:
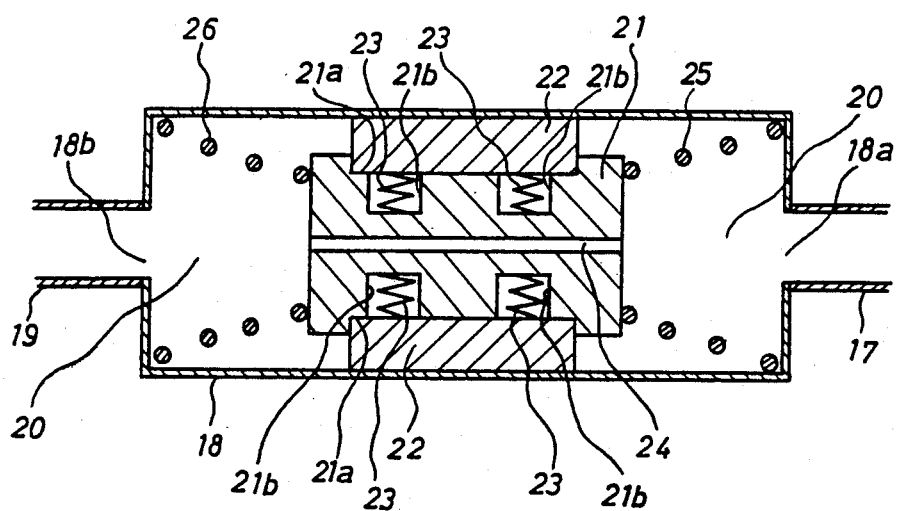
FIG. 2A is a sectional view of the vibration damping unit of FIG. 1.

In FIG. 2A which is the sectional view of the vibration damping cylinder 18 of the embodiment of this invention in FIG. 1, an opening 18a forming one end of an approximately cylindrical casing 18 is connected to other end of piping 6 one end of which is connected to the master cylinder device 3 (FIG. 1). The other end of cylinder 15 is connected by piping 6' to the slave cylinder device 7 (FIG. 1) to an opening 18b at the other end of the approximately cylindrical casing 18. The casing 18 forms a cylindrical cylinder chamber 20. An approximately cylindrical moving body 21 is disposed in the cylinder chamber 20. An annular groove 21a having a specified width is formed over the entire outer periphery of the moving body 21. Holes 21b are formed in a double line on a bottom surface of the annular groove 21a with appropriate spaces left therebetween in circumferential direction. A cylindrical friction member 22 made of reinforced synthetic resin etc., for example, fits in the annular groove 21a. The friction member 22 is divided circumferentially into plural pieces, and each divided piece is movable in radial direction though by an extremely small distance. Coil springs 23 serving as first urging members are disposed in the holes 21b respectively. The coil springs 23 press and urge the divided pieces of the friction members 22 onto an inner periphery of the casing 18. An orifice 24 is formed on an axis of the moving body 21. The orifice 24 pierces the moving body 21 through its axis. A coil spring 25 serving as a second urging member is interposed between one end i.e. right end of the moving body 21 and one end inner face i.e. right end inner face of the casing 18. A coil spring 26 serving as the second urging member is interposed between the other end i.e. left end of the moving body 21 and the other end inner face i.e. left end inner face of the casing 18. Namely, the moving body 21 is pressed from both sides by the coil springs 25 and 26, so that it stands still at an illustrated position at which the coil springs 25 and 26 balance each other under normal operating state.

Function of the Invention

When the clutch pedal 1 is trodden, it swings around the shaft 2 clockwise in FIG. 1 to cause the piston 4 to move toward left side of FIG. 1 against an urging force of the coil spring 13, thus squeezing liquid in the liquid chamber 5 into the piping 6 composing a part of the liquid passage 6, 6'. Liquid squeezed from the liquid chamber 5 into the piping 6 flows through the piping 6 to a right end portion of the cylinder chamber 20. Here, the moving body 21 is moved by liquid pressure toward left side of FIG. 2A against the urging force of the coil spring 26 because a passage resistance of the orifice 24 is large, so that liquid from the left end portion of the cylinder chamber 20, FIG. 2A is squeezed into the piping 6' composing a liquid passage between chamber 20 of cylinder 18 and device 7. Liquid squeezed from the left end portion of the cylinder chamber 20 into the piping 6' flows through the piping 6' into the liquid chamber 8. Consequently, the piston 9 is urged toward left side of FIG. 1 and the release rod 11 is swung clockwise in FIG. 1 against a spring urging force of the clutch 10, so that the clutch 10 is disengaged.

As the trodden force of the clutch pedal 1 is gradually released, the clutch 10 is slowly engaged by a spring force of the clutch 10 and the release rod 11 is swung counterclockwise in FIG. 1, and the piston 9 is thus pushed toward right side of FIG. 1 against the urging force of the coil spring 14. Liquid in the liquid chamber 8 is thereby squeezed into the piping 6', and this liquid flows through the piping 6' into the left end portion of the cylinder chamber 20. Here, the moving body 21 is moved by hydraulic pressure toward right side against the urging force of the coil spring 25 because the passage resistance of the orifice 24 is large, so that liquid in the right end portion of the cylinder chamber 20 is squeezed into the piping 6. Liquid squeezed into the piping 6 flows through the piping 6 into the liquid chamber 5. The piston 4 is thereby urged toward right side of FIG. 1 and the clutch pedal 1 is swung counterclockwise in FIG. 1 to be returned to its original position.

When the clutch pedal 1 is kept trodden or released under a state where the moving body 21 is moved toward right or left side from a prescribed position shown in FIG. 2A by the treading or releasing motion of the clutch pedal 1, liquid flows from left to right side or from right to left side of the moving body 21 through the orifice 24 so that the moving body 21 is thereby moved toward left or right side by the urging force of the coil spring 25 or coil spring 26, because the moving body 21 is urged toward right side by the coil spring 26 or toward left side by the coil spring 25 and the orifice 24 is formed on the moving body 21. Namely, the moving body 21 is returned to the prescribed position when the clutch pedal 1 is kept trodden or released for a specified period.

Figure 3A:
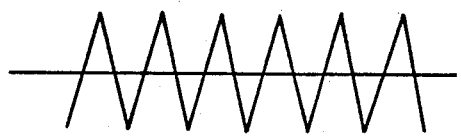
FIG. 3A and 3B are explanatory diagrams for pressure fluctuation propagated through a hydraulic circuit of the unit of FIG. 2.
Figure 3B:
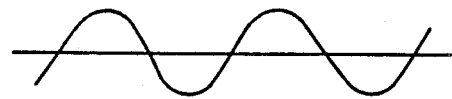

Hydraulic pressure fluctuation in the hydraulic circuit due to vibration of the clutch 10 acts on the other side i.e. the left side of the moving body 21. However, since the friction member 22 is urged toward and pressed on the inner periphery of the casing 18 by the urging force of the coil spring 23 so as to cause the friction member 22 to move integrally with the moving body 21, the movement of the moving body 21 is subjected to a resistance caused by a friction force between the friction member 22 and the inner periphery of the casing 18. Accordingly, the moving body 21 does not reciprocate following after the hydraulic pressure fluctuation acting on the left face thereof, but it reciprocates slowly and slightly accompanying a hysteresis generated by the resistance. Consequently, the hydraulic pressure fluctuation acting on the one side of the moving body 21 i.e. the right side of the cylinder chamber 20 is damped considerably as compared with the hydraulic pressure fluctuation acting on its left side. Namely, when the hydraulic pressure on the left side of the cylinder chamber 20 fluctuates as shown by FIG. 3A, the hydraulic pressure on the right side of the cylinder chamber 20 fluctuates as shown by FIG. 3B. The hydraulic pressure fluctuation may be transmitted also through the orifice 24. However, since a sectional area of flow passage of the orifice 24 is very small, the transmission of hydraulic pressure fluctuation through the orifice 24 is very slight and can be omitted practically.

As mentioned above, the hydraulic circuit is partitioned into the master cylinder device 3 side and the slave cylinder device 7 side by the moving body 21 having the moving resistance generated by the friction force between the friction member 22 and the casing 18, so that the vibration propagated from the clutch 10 through the hydraulic circuit to the clutch pedal 1 can be damped preferably without producing the stroke loss when treading the clutch pedal 1.

Embodiment 2

Figure 4:
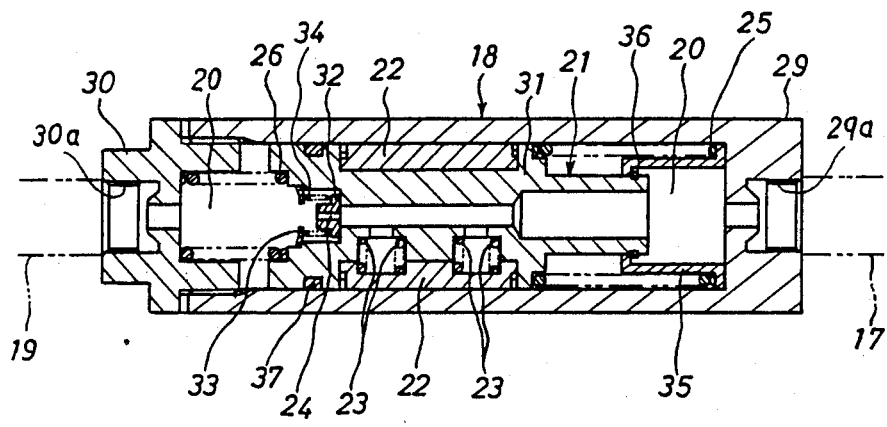
FIG. 4 is a sectional view of a vibration damping unit of another embodiment.
Figure 5:
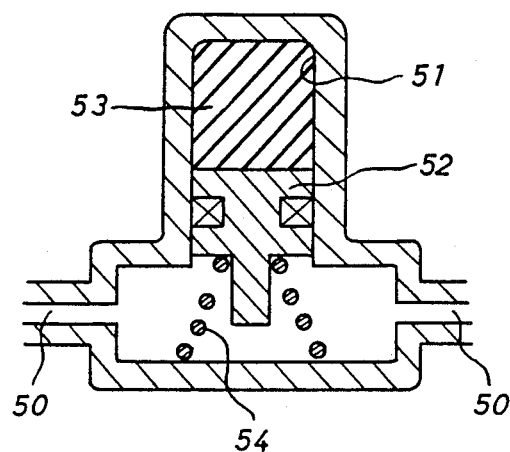
FIG. 5 is a sectional view of a conventional hydraulic clutch releasing means.

In FIG. 4 which is the sectional view of essential part of the hydraulic clutch releasing means of another embodiment, the casing 18 is composed of a cylindrical member 29 having an approximately cylindrical shape and an annular member 30 having an approximately annular shape and screwed into the other end i.e. left end of the cylindrical member 29. Female threads 29a and 30a into which the pipings 6 and 6' are screwed are made on the cylindrical member 29 and the annular member 30. The moving body 21 is composed of an approximately cylindrical main moving body 31 and a check valve 32 contacting with the other end i.e. left end of the main moving body 31. The orifice 24 is formed on the check valve 32. An annular spring shoe 33 is fitted in and secured to a left end inner periphery of the main moving body 31. A coil spring 34 is interposed between the spring shoe 33 and the check valve 32. Namely, the check valve 32 is pressed on the main moving body 31 by an urging force of the coil spring 34. A coil spring 25 is interposed between the main moving body 31 and one end i.e. right end of an approximately cylindrical spring shoe 35. The other end i.e. left end of the spring shoe 35 is mated with an annular stopper 36 from left side, which is fitted in and secured to a right end outer periphery of the main moving body 31. Namely, the spring shoe 35 is mated with the stopper 36 to move integrally with the main moving body 31 when the main moving body 31 moves toward left, and the spring shoe 35 is urged by the coil spring 25 to move toward right when the main moving body 31 moves toward right. An annular sealing member 37 for sealing a clearance between the main moving body 31 and an inner periphery of the cylindrical member 29 is provided on a left end outer periphery of the main moving body 31.

According to this embodiment, a large amount of pressure liquid flows from the right end portion to left end portion of the cylinder chamber 20 through the opened check valve 32 because the check valve 32 is opened by the liquid pressure against the urging force of the coil spring 34 when the clutch pedal 1 is trodden, so that the treading force of the clutch pedal 1 can be minimized and the clutch 10 can be disengaged quickly. A time required for the moving body 21 to return to the prescribed position can be shortened because of the short moving distance of the moving body 21 toward left side.

Embodiment 3

Figure 2B:
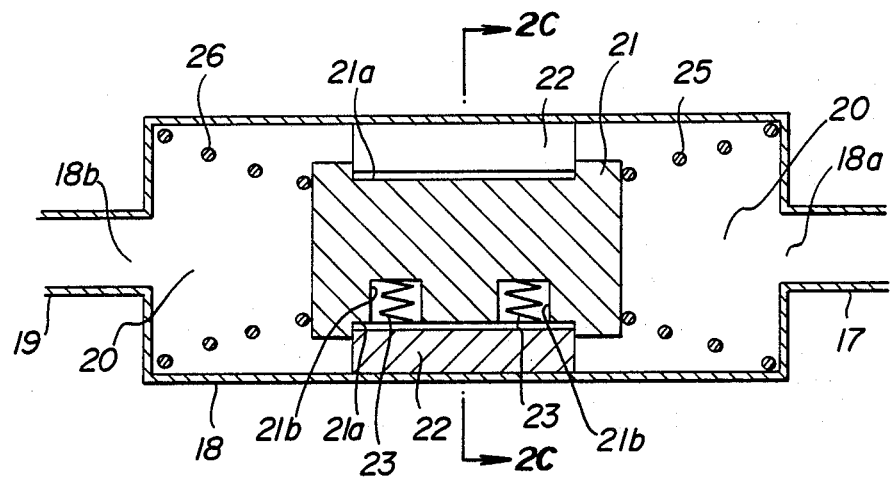
FIG. 2B is a modification of the vibration damper unit shown in FIG. 2A.
Figure 2C:
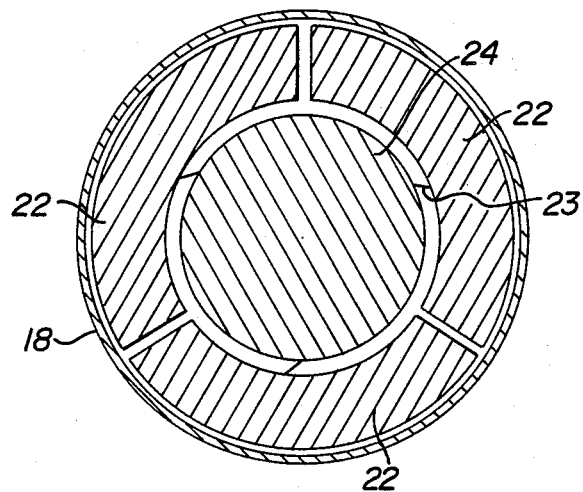
FIG. 2C is a sectional view taken along line 2C—2C of the vibration damper unit of FIG. 2B.

The orifice 24 is formed on the moving body 21 in the Embodiment 1. However, as shown in FIGS. 2B and 2C, the orifice 24 may be formed on the friction member 22, or clearances between divided pieces of the friction member 22 may be utilized as the orifice 24.

Embodiment 4

A pair of coil springs 25 and 26 are installed in order for serving as the second urging member in the Embodiment 1. However, such a structure may be employed that any one of the springs is installed and one and other ends of the spring are secured to the spring casing 18 and the moving body 21 respectively, so that the moving body 21 can be returned to the prescribed position by one coil spring.

Effect of the Invention

Differing from the conventional means wherein the hydraulic pressure fluctuation is absorbed by the rubber elastic body, the hydraulic circuit is partitioned into the master cylinder device side and the slave cylinder device side by using the moving body having the moving resistance generated by the friction force between the friction member and the peripheral wall of cylinder chamber in the present invention as described above, so that the vibration propagated from the clutch through the hydraulic circuit to the clutch pedal can be damped preferably without producing the stroke loss when treading the clutch pedal.

What is claimed is:

1. A hydraulic clutch releasing means equipped with a master cylinder device driven by operating a clutch pedal and a slave cylinder device driven by hydraulic pressure supplied from the master cylinder device for engaging or disengaging a clutch, characterized by that a cylindrical cylinder chamber formed by a casing and having inlet and outlet ports for pressurized liquid at opposite axial ends is installed in a liquid passage communicating a liquid chamber of said master cylinder device with a liquid chamber of said slave cylinder device; a cylindrical movable body member having a circumferential friction member divided into plural pieces contacting with a peripheral wall of the cylinder chamber, plural first urging members fitted to said movable body member for pressing said friction members onto the peripheral wall of said cylinder chamber, and a second urging member in said cylinder chamber for urging said movable body member in an axial direction in said cylinder chamber for locating said moving body member at a prescribed axial position in said cylinder chamber; and orifice means in an axial direction on said moving body member.

2. A hydraulic clutch releasing means as set forth in claim 1, in which said orifice member is formed as a passage through said movable body member.

3. A hydraulic clutch releasing means as set forth in claim 1, in which clearances between said plural pieces of said friction member form said orifice means.

4. A hydraulic clutch releasing means as set forth in claim 1, in which said second urging member consists of a pair of coil springs urging said moving body member from opposite sides.

5. A hydraulic clutch releasing means as set forth in claim 1, in which said second urging member consists of one coil spring connecting said casing with said moving body member.

6. A hydraulic clutch releasing means as set forth in claim 1, in which said moving body member is composed of an approximately cylindrical main moving body member and a check valve checking flow of pressure liquid from said slave cylinder device side of said moving body member to said master cylinder device side of said moving body member, and said orifice is formed on said check valve.

7. A hydraulic clutch releasing means as set forth in claim 6, in which a spring shoe fits onto an outer periphery of said main moving body member in such a manner as sliding freely within a specified distance, and a coil spring serving as said second urging member is interposed between said main moving body member and said spring shoe.

8. A hydraulic clutch releasing means as set forth in claim 6, in which a sealing member is installed between an end outer periphery of said main moving body member and an inner periphery of said casing.

* * * * *